(12) United States Patent
Idowu et al.

(10) Patent No.: US 11,698,362 B2
(45) Date of Patent: Jul. 11, 2023

(54) SYSTEM AND METHOD FOR PROVIDING ON-LINE MEASUREMENT OF IMPURITIES IN LIQUID ETHYLENE OXIDE STREAMS

(71) Applicant: Dow Technology Investments LLC, Midland, MI (US)

(72) Inventors: Ademola Idowu, Lake Jackson, TX (US); Louise A. Mahoney, Freeport, TX (US); Robert M. Callender, Lake Jackson, TX (US); Clair J. Emery, Hahnville, LA (US)

(73) Assignee: Dow Technology Investments LLC, Midland, MI (US)

( * ) Notice: Subject to any disclaimer, the term of this patent is extended or adjusted under 35 U.S.C. 154(b) by 186 days.

(21) Appl. No.: 16/957,446

(22) PCT Filed: Dec. 21, 2018

(86) PCT No.: PCT/US2018/067065
§ 371 (c)(1),
(2) Date: Jun. 24, 2020

(87) PCT Pub. No.: WO2019/133475
PCT Pub. Date: Jul. 4, 2019

(65) Prior Publication Data
US 2021/0033571 A1    Feb. 4, 2021

Related U.S. Application Data

(60) Provisional application No. 62/610,428, filed on Dec. 26, 2017.

(51) Int. Cl.
*G01N 30/06* (2006.01)
*G01N 30/12* (2006.01)
(Continued)

(52) U.S. Cl.
CPC ............ *G01N 30/12* (2013.01); *G01N 30/30* (2013.01); *G01N 30/78* (2013.01)

(58) Field of Classification Search
CPC ............................. G01N 30/12; G01N 30/30
See application file for complete search history.

(56) References Cited

U.S. PATENT DOCUMENTS 2,976,414 A     3/1961   Heinz
3,118,299 A  *  1/1964   Maxwell ............ G01N 33/241
                                              73/19.09
(Continued)

FOREIGN PATENT DOCUMENTS

CN    201788175 U    4/2011
CN    103728164 A    4/2014
(Continued)

OTHER PUBLICATIONS

Translation of CN103728164 from the European Patent Office (EPO) dated Mar. 20, 2019.
(Continued)

*Primary Examiner* — Jamel E Williams
*Assistant Examiner* — Alex T Devito (57) ABSTRACT

Automated systems and methods for obtaining of the concentration of impurities in a liquid ethylene oxide product stream are shown and described. The systems and methods employ remote injection and flash vaporization of small volumes of liquid ethylene oxide into a carrier gas to minimize polymerization of the ethylene oxide and accumulation of polymerized ethylene oxide. Ethylene oxide peaks are diverted from the gas chromatograph effluent detector to stabilize baseline signal errors and avoid errors in the calculation of an impurity with an adjacent retention time peak. The systems and methods may be used for feedback, feedforward, dynamic matrix, and/or model-based predictive control of ethylene oxide purity. The systems and
(Continued)

methods reduce lag times and errors associated with relying on laboratory analyses to make process adjustments.

15 Claims, 2 Drawing Sheets (51) Int. Cl.
*G01N 30/30* (2006.01)
*G01N 30/78* (2006.01)

(56) References Cited

U.S. PATENT DOCUMENTS

| | | | | |
|---|---|---|---|---|
| 4,033,617 | A | * | 7/1977 | Cocuzza ............ C07D 301/32 |
| | | | | 203/75 |
| 4,617,828 | A | | 10/1986 | Ellebracht |
| 4,850,907 | A | | 7/1989 | Mula |
| 6,103,934 | A | * | 8/2000 | Hallinan ............... C07C 51/12 |
| | | | | 562/517 |
| 7,851,760 | B2 | | 12/2010 | Tate et al. |
| 2007/0273882 | A1 | * | 11/2007 | Smith .................... G01N 21/39 |
| | | | | 356/437 |
| 2014/0365195 | A1 | | 12/2014 | Lahiri et al. |
| 2015/0096349 | A1 | | 4/2015 | Johnson |
| 2016/0365236 | A1 | * | 12/2016 | Green ................. H01J 49/0036 |

FOREIGN PATENT DOCUMENTS

| | | |
|---|---|---|
| CN | 204389458 U | 6/2015 |
| JP | 2002533305 A | 10/2002 |
| WO | 2009150208 A1 | 12/2009 |
| WO | 2010014182 A1 | 2/2010 |
| WO | 2010014183 A1 | 2/2010 |
| WO | 2014195915 A1 | 12/2014 |
| WO | 2017102701 A1 | 6/2017 |

OTHER PUBLICATIONS

Translation of CN103728164 from the World intellectual Property Organization (WIPO) dated Jul. 16, 2019.
International Search Report and Written Opinion dated Mar. 26, 2019.
Othmer, Kirk, "Ethylene Oxide", Encyclopedia of Chemical Technology, vol. 10, pp. 632-673 (Feb. 2005).
"Chromatographic Analysis of Ethylene Oxide", Hangzhou Electrochemical Plant, Hangzhou Chemical Industry, No. Z1, 1975, pp. 35-38.
English translation of CN201788175U from Total Patent One.
English translation of CN204389458U from Total Patent One.
JP2002533305A (English equivalent: WO00037405 published Jun. 29, 2000).

* cited by examiner

SYSTEM AND METHOD FOR PROVIDING ON-LINE MEASUREMENT OF IMPURITIES IN LIQUID ETHYLENE OXIDE STREAMS

TECHNICAL FIELD

This disclosure relates generally to methods and systems for measuring impurities in liquid ethylene oxide product streams, and more specifically, to on-line methods for automatically measuring such impurity levels.

BACKGROUND

Processes for making high purity, liquid ethylene oxide are known. The ethylene oxide is produced via catalytic epoxidation of ethylene in the presence of oxygen using silver based catalysts. The ethylene oxide is then removed from the remaining reaction products and unreacted reactants using water absorption and condensed before being sent to an ethylene oxide refining unit for further purification. The concentration of gaseous ethylene oxide exiting the reactor is typically from about one to about four percent by volume. The concentration of liquid ethylene oxide entering the refining unit is typically greater than 90 percent by weight.

The final liquid ethylene oxide product stream (referred to as a "liquid ethylene oxide refined product stream" herein) from a refining unit typically has over 99 weight percent liquid ethylene oxide with trace amounts of water, carbon dioxide, acetaldehyde, and formaldehyde. Liquid ethylene oxide entering the refining unit is initially purified in an ethylene oxide purification column such as a trayed and/or packed distillation column. The ethylene oxide purification column bottoms are then further purified in an ethylene oxide refining column. In certain processes, the overhead liquid product from the ethylene oxide purification column is the final product stream (liquid ethylene oxide refined product stream). The purity requirements for this stream are often very stringent, with the allowable amounts of aldehydes, water, and carbon dioxide each being well below 10 ppm by weight. The purification column process variables that affect the purity of the liquid ethylene oxide product (e.g., reflux ratio, column top temperature, column top pressure) are typically adjusted to obtain the desired degree of purity. However, the impurity levels are determined by sampling the liquid ethylene oxide, transporting it to a lab, and having the lab conduct an off-line analysis using techniques such as liquid chromatography (LC), gas chromatography (GC), titration, and Karl-Fischer titration. It can take several hours before a lab result comes back. The resulting lag time makes it difficult to adjust the process variables based on the measured impurity concentrations, rendering closed loop composition control impractical. In the case of an upset or process fluctuation, the actual impurity levels may be unknown until samples can be pulled and tested. In the meantime, measures must be taken to prevent off-spec product from reaching downstream units or customers. In some cases, the ethylene oxide product may have to go on "total recycle" until the lab confirms that it is on spec, or the process may need to be adjusted aggressively to ensure that no off-spec product is produced. This may involve cutting feed rates to the purification process or operating the process conservatively (and inefficiently) to ensure that the impurity levels in the product are not excessive. The financial losses may be significant until consistent lab results are obtained for a specified period of time. Additionally, multiple lab methods are typically required to obtain concentrations for all of the impurities in the ethylene oxide product. In the case of acetaldehyde and formaldehyde, gas and liquid chromatography are used. However, commercial lab GCs with the requisite sensitivity to measure concentrations of these components in liquid ethylene oxide refined product streams do not currently exist for impurities levels at 10 ppm and below for thermal conductivity detectors. Thus, existing commercially available lab GCs can only provide approximate concentration measurements of liquid ethylene oxide refined product stream impurities if a thermal conductivity detector is used. Instead, more complex methods using flame ionization detectors are commonly used for lab GCs to measure contaminants at levels of below 10 ppm. These methods are not suitable for online process GCs. In addition, other test methods are required in the lab to test for water as an impurity as flame ionization detectors cannot detect water.

Liquid chromatography (LC) is used to measure acetaldehyde and formaldehyde concentrations off line, but current liquid chromatographs can only measure these aldehydes indirectly. The aldehydes must first be derivatized to a compound that can be detected by the LC. LCs cannot measure carbon dioxide or water concentrations. Accurate lab measurements of carbon dioxide and water require the use of titration and Karl-Fischer titration, respectively. Off-line sampling is itself costly due to the personnel and lab requirements, and the lab results are subject to errors due to sample contamination between the process and the lab. Thus, it would be desirable to obtain automated, on-line composition data for the liquid ethylene oxide product stream.

Certain automated, on-line composition analyzers exist. One known type of analyzer is an on-line liquid chromatograph. While they exist, on-line LCs are not prevalent and are incapable of directly measuring aldehyde concentrations because as in the case of lab LCs, the aldehydes must be derivatized to a compound that can be detected by the LC, which makes the technique unsuitable for on-line use. Also, like lab LCs, on-line LCs cannot measure the concentration of water or carbon dioxide impurities.

On-line gas chromatographs (GC) also exist. Gas chromatographs are columns or series of columns with a stationary phase that causes different molecules to flow through the column at different rates, thus causing them to separate from one another and elute from the column at different times. A gas chromatograph effluent detector detects the presence of the various compounds as they exit the gas chromatograph columns in accordance with a selected physical property and provides a signal, the strength of which corresponds to the concentration of the various components in the sampled stream. A carrier gas flows with the compounds being detected and provides a baseline signal from the detector relative to which the measured compound signals are compared.

The time it takes for each compound to exit the column is typically known as the "retention time". A plot of the detector signal versus time yields a series of peaks, with each peak representing the retention time of each compound being detected. The area under a peak can be used to determine the concentration of the corresponding compound. Initially, a standard with known concentrations of the various compounds is used to determine the retention times of the various compounds. A variety of different gas chromatograph effluent detectors exist, each using different physical properties to detect compositional changes in the gas chromatograph effluent. Such detectors include flame ionization detectors (FID), electron capture detectors (ECD), flame photometric detectors (FPD), photoionization detectors (PID), thermal conductivity detectors (TCD) and electrolytic conductivity detectors (ELCD).

It would be desirable to obtain on-line, real time analyses of the levels of impurities such as aldehydes, water, and carbon dioxide in liquid ethylene oxide streams from ethylene oxide purification processes. While on-line gas chromatographs exist, there are significant challenges to using them for measuring impurity levels in high purity, liquid ethylene oxide, and in particular, liquid ethylene oxide from a purification process in which impurity specifications are typically well under 100 ppm by weight.

The first challenge is providing the liquid ethylene oxide as a gas to the gas chromatograph. The typical processes used to vaporize liquid ethylene oxide raise its temperature to a point where polymerization is initiated. They also continuously vaporize the ethylene oxide, and which tends to cause the entrainment of any existing polymerized ethylene oxide. The polymer leaves deposits and plugs up equipment. Thus, it is desirable to reduce the amount of ethylene oxide injected into the sampling system and to avoid temperatures at which it is likely to polymerize. Also, although the unknown sample of ethylene oxide is a liquid, the standard (used to calibrate the GC) cannot be practically made due to the high vapor pressure of liquid ethylene oxide. Thus, the standard must be gas even though the sample is a liquid and must be introduced into the system other than how the sample is introduced.

Another challenge is finding a suitable gas chromatograph effluent detector. It has been found that certain detectors, such as flame ionization detectors, will not detect the presence of formaldehyde, carbon dioxide or water. Thermal conductivity detectors can detect these compounds. However, traditional thermal conductivity detectors lack the sensitivity to determine the concentrations of liquid ethylene oxide impurities at the relevant specification levels (less than 10 ppm). The low permissible concentrations of impurities in many commercial ethylene oxide processes also produces challenges for using automated, on-line impurity concentration measurements. To accurately and repeatably determine concentrations of impurities below 10 ppm by weight requires a stable GC baseline (i.e., a stable gas chromatograph effluent detector signal for the carrier gas), and stable (repeatable) peak retention times for the various compounds. Advanced process control strategies are not practical if the baseline signal is subject to upsets because such upsets will affect the accuracy of the measured impurity concentrations.

Micro thermal conductivity conductors (Micro TCD) and high sensitivity thermal conductivity detectors exist and can measure aldehyde, water, and carbon dioxide impurity levels on the order of less than 10 ppm. For example, the Yokogawa Electric Corporation supplies a Model GC1000 gas chromatograph that comes with a high sensitivity thermal conductivity detector with a measurable range of 1 ppm to 100%. However, because of their sensitivity for measuring low impurity concentrations, such high sensitivity or Micro TCDs tend to over-range when exposed to the high concentrations of ethylene oxide in liquid ethylene oxide refined product streams. In addition, the peaks for acetaldehyde and ethylene oxide are close. Therefore, the ethylene oxide thermal conductivity signal may distort the acetaldehyde signal, resulting in inaccurate acetaldehyde concentration determinations. One known solution for this type of problem is to backflush the gas chromatograph or to use a splitter. However, because of the small amounts of impurities being measured and the sensitivity of micro TCDs, the backflush technique would produce a significant baseline upset in the carrier gas signal, yielding inaccurate concentration determinations. The splitter technique is generally not consistent. At impurity levels typically found in ethylene oxide purification processes, the splitter technique could introduce an error on the order of 25%.

Also, using thermal conductivity detectors forecloses the use of temperature programmable ovens to speed up the composition analysis because changes in temperature will affect the thermal conductivity of the gas. In certain cases, adjusting the oven temperature causes the compounds in the sample being tested to separate more distinctly from one another (better resolution), yielding clearer and more distinct compound peaks from the gas chromatograph effluent detector. However, because adjustments to the oven temperature will affect the thermal conductivity of the sample, the resulting thermal conductivity signals will not be indicative of the concentrations of the compounds comprising the sample.

SUMMARY

In accordance with a first aspect of the present disclosure, an automated method of detecting impurities in a liquid ethylene oxide stream having at least one impurity is provided. The method detects impurities in the liquid ethylene oxide stream as the liquid ethylene oxide stream is produced by a processing unit. The method comprises injecting a sample volume from a liquid ethylene oxide stream into a gas chromatograph train having a gas chromatograph effluent stream, and generating at least one signal indicative of the corresponding concentration of the at least one impurity.

In accordance with a second aspect of the present disclosure, a system for determining the concentration of at least one impurity in a liquid ethylene oxide product stream is provided. The system comprises a gas chromatograph train having a gas chromatograph effluent stream, wherein the gas chromatograph train is in selective fluid communication with a liquid ethylene oxide sample chamber that is in selective fluid communication with the liquid ethylene oxide stream and a carrier gas stream. The system also includes a gas chromatograph effluent detector, wherein the gas chromatograph effluent stream is in fluid communication with the GC effluent detector and a vent stream, and when the gas chromatograph effluent stream is fluidly coupled to the gas chromatograph effluent detector, the gas chromatograph effluent detector generates a signal indicative of a concentration of at least one impurity in the gas chromatograph effluent stream.

In accordance with a third aspect of the present disclosure, a system for controlling the concentration of at least one impurity in a liquid ethylene oxide stream from an ethylene oxide purification column is provided. The system comprises a computer readable medium having stored thereon a set of computer executable instructions comprising a mathematical model relating a predicted value of the concentration of the at least one impurity to values of a plurality of ethylene oxide process variables such that when executed by a computer processor, the computer executable instructions (i) calculate a predicted value of the concentration of the at least one impurity from the mathematical model and the values of the plurality of ethylene oxide purification column process variables; and (ii) update the mathematical model based on the predicted value of the concentration of the at least one impurity and at least one value of the concentration of the at least one impurity determined by the system for determining the concentration of at least one impurity; and a controller that automatically adjusts the value of one or more of the plurality of ethylene oxide process variables based on the predicted value of the concentration of the at least one impurity.

DETAILED DESCRIPTION

As discussed below, the present disclosure provides an automated method for detecting impurities in a liquid ethylene oxide stream. In certain examples, the liquid ethylene oxide stream is the ethylene oxide product or "make" stream from an ethylene oxide refining unit. In the same or other examples, the liquid ethylene oxide stream is the overhead liquid product of an ethylene oxide purification column.

Figure 1:
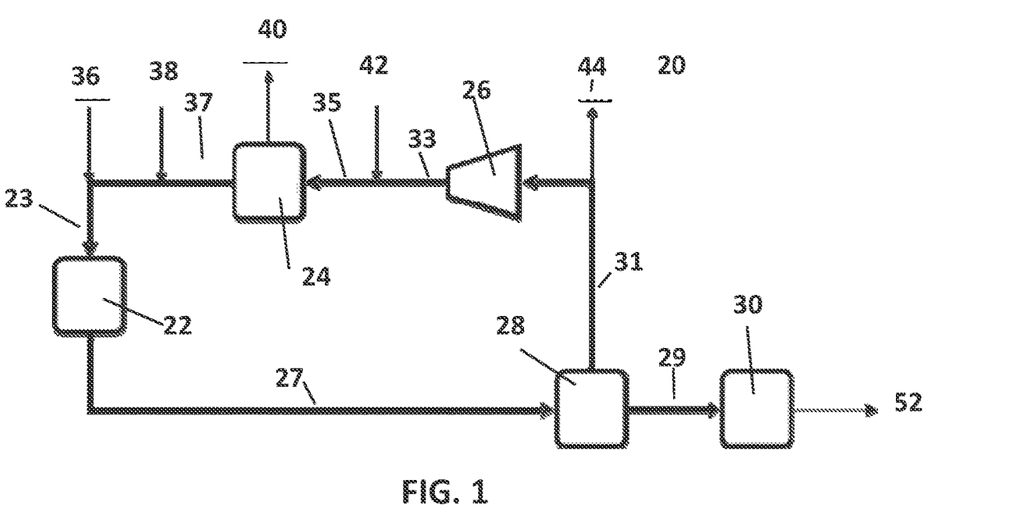
FIG. 1 is a schematic view of an ethylene oxide reaction system and a downstream refining unit.

FIG. 1 is a schematic of an ethylene oxide reaction system 20 and refining unit 30. Ethylene oxide reaction system 20 comprises an ethylene oxide reactor 22, an ethylene oxide removal unit 28, a cycle gas compressor 26, and a carbon dioxide removal unit 24. The feed streams to ethylene oxide reaction system 20 comprise an ethylene feed stream 38, an oxygen (or air) feed stream 36, and a ballast gas feed stream 42. The outputs from the reaction system 20 comprise a cycle gas purge stream 44, a carbon dioxide product stream 40, and an ethylene oxide reaction system product stream 29.

The ethylene oxide reactor 22 includes a conventional or high efficiency, silver catalyst. As is known to those skilled in the art, there are a variety of known promoters, that is, materials which, when present in combination with particular catalytic materials, for example, silver, benefit one or more aspect of catalyst performance or otherwise act to promote the catalyst's ability to make a desired product, for example ethylene oxide or propylene oxide. Both solid-phase and gas phase promoters may be used. Such promoters in themselves are generally not considered catalytic materials. The presence of such promoters in the catalyst has been shown to contribute to one or more beneficial effects on the catalyst performance, for example enhancing the rate or amount of production of desired product, reducing the temperature required to achieve a suitable rate of reaction, reducing the rates or amounts of undesired reactions, etc. Examples of well-known solid-phase promoters for catalysts used to produce ethylene oxide include compounds of lithium, sodium, potassium, rubidium, cesium, rhenium, sulfur, manganese, molybdenum, and tungsten.

The gas phase promoter is generally a compound that enhances the efficiency and/or activity of the process for producing the desired alkylene oxide. Preferred gas phase promoters include organic chlorides. More preferably, the gas phase promoter is at least one selected from the group consisting of methyl chloride, ethyl chloride, ethylene dichloride, vinyl chloride, and mixtures thereof. Ethyl chloride and ethylene dichloride are most preferred. Using chlorohydrocarbon gas phase promoters as an example, it is believed that the ability of the promoter to enhance the performance (e.g., efficiency and/or activity) of process for making the desired alkylene oxide depends on the extent to which the gas phase promoter chlorinates the surface of the catalyst, for example, by depositing particular chlorine species such as atomic chlorine or chloride ions on the catalyst or in the gas phase above the catalyst. However, hydrocarbons lacking chlorine atoms are believed to strip chlorides from the catalyst, and therefore, detract from the overall performance enhancement provided by the gas phase promoter. Discussions of this phenomenon may be found in Berty, "Inhibitor Action of Chlorinated Hydrocarbons in the Oxidation of Ethylene to Ethylene Oxide," *Chemical Engineering Communications*, Vol. 82 (1989) at 229-232 and Berty, "Ethylene Oxide Synthesis," *Applied Industrial Catalysis*, Vol. I (1983) at 207-238. In certain examples, a parameter is used to calculate the net chloriding effect of the chlorohydrocarbons and hydrocarbons lacking chlorine atoms in the feed gas.

In exemplary processes of making ethylene oxide, oxygen may be provided as substantially pure oxygen or air in oxygen feed gas stream 36. If pure oxygen is used, ballast gases or diluents such as nitrogen or methane may also be included in ballast gas feed stream 42 to maintain the oxygen concentration below the maximum level allowed by flammability considerations. The concentration of oxygen in the reactor feed stream 23 may vary over a wide range, and in practice, flammability is generally the limiting factor for oxygen concentration. Generally, the oxygen concentration in the reactor feed 23 will be at least one (1) mole percent, preferably at least two (2) mole percent, and still more preferably at least four (4) mole percent. The oxygen concentration will generally be no more than fifteen (15) mole percent, preferably no more than twelve (12) mole percent, and even more preferably no more than nine (9) mole percent. The ballast gas (e.g., nitrogen or methane) is generally from 50 mole percent to 80 mole percent of the total composition of reactor feed stream 23. Methane ballast gas is preferred over nitrogen because, due to its higher heat capacity, it facilitates the use of higher oxygen concentrations in the cycle, and therefore, improves both activity and efficiency.

Ethylene is provided to reactor feed stream 23 via ethylene feed gas stream 38. The concentration of ethylene in the reactor feed stream 23 may vary over a wide range. However, it is preferably at least eighteen (18) mole percent and more preferably at least twenty (20) mole percent. The concentration of ethylene in the reactor feed stream 23 is preferably no greater than 50 mole percent, and more preferably is no greater than 40 mole percent. The ethylene oxide reactor product stream 27 typically comprises ethylene oxide, unreacted feed gas components (ethylene, oxygen, and/or organic chlorides), and by products such as water, carbon dioxide, acetaldehyde, and formaldehyde. The amount of ethylene oxide in the reactor product stream 27 generally comprises from about one (1) percent by volume to about four (4) percent by volume, preferably from about 1.5 percent to about 3.5 percent by volume, and more preferably from about two (2) percent by volume to about three (3) percent by volume of the reactor product stream 27.

The ethylene oxide reactor 22 may be of a variety of reactor types, including, fixed bed tubular reactors, continuous stirred tank reactors (CSTR), and fluid bed reactors, a wide variety of which are well known to those skilled in the art and need not be described in detail herein. The desirability of recycling unreacted feed, or employing a singlepass system, or using successive reactions to increase ethylene conversion by employing reactors in series arrangement can also be readily determined by those skilled in the art. The particular mode of operation selected is usually dictated by process economics Carbon dioxide is an unwanted byproduct of the epoxidation process and/or impurity and is removed as carbon dioxide product stream 40 via carbon dioxide removal unit 24. The carbon dioxide concentration in the reactor feed stream 23 has a large adverse effect on the efficiency, activity and/or stability of the high-efficiency catalyst. In commercial ethylene epoxidation processes, at least part of the carbon dioxide is removed continuously in order to control its concentration to an acceptable level in the cycle. The carbon dioxide concentration in the reactor feed 23 is generally no more than 5 mole percent and preferably no more than 3 mole percent of the total composition of reactor feed. Water is also a reaction by-product, and may be present in the reactor feed gas 23 in concentrations that are preferably from 0 to no more than three (3) mole percent.

The ethylene oxide reactor product stream 27 is fed to an ethylene oxide removal unit 28. Ethylene oxide removal unit 28 removes ethylene oxide from the reactor product stream 27 and recycles the unremoved components via recycle stream 31 to cycle gas compressor 26. In certain examples, the ethylene oxide removal unit 28 comprises an ethylene oxide absorber that receives gas from the reactor product stream 27 as its feed and uses water as an absorption medium to remove ethylene oxide from the unreacted feed components and byproducts as the absorber bottoms in ethylene oxide removal unit product stream 29. Ethylene oxide removal unit recycle stream 31 is fed to cycle gas compressor 26. However, a portion of the recycle stream 31 may be purged via purge stream 44 to avoid a build-up of carbon dioxide and its impact on catalyst selectivity. Cycle gas compressor 26 increases the pressure of recycle stream 31 and may include a discharge pressure controller which can be used to control the reactor 22 pressure.

Cycle gas compressor discharge stream 33 joins with ballast gas feed stream 42 to form carbon dioxide removal unit 24 feed stream 35. Carbon dioxide removal unit 24 removes carbon dioxide product stream 40 to form reactor recycle stream 37. In certain examples, carbon dioxide removal unit 24 comprises a carbon dioxide stripper. Reactor recycle stream 37, oxygen feed stream 36 and ethylene feed stream 38 combine to form reactor feed stream 23.

The ethylene oxide removal unit 28 product stream 29 is also the ethylene oxide refining unit 30 feed stream 29. Ethylene oxide refining unit feed stream 29 comprises at least about 50 percent, preferably at least about 70 percent, more preferably at least about 80 percent, and still more preferably at least about 90 percent liquid ethylene oxide by weight of the refining unit feed stream 29. In some examples, ethylene oxide is present in refining unit feed stream 29 in an amount equal to or greater than 99 percent by weight of the refining unit feed stream 29.

The ethylene oxide reaction system product stream 29 is the net ethylene oxide product produced by the ethylene oxide reaction system 20. The ethylene oxide reaction system product stream 29 is fed to the ethylene oxide refining unit 30, which is an ethylene oxide purification process, the outputs of which include liquid ethylene oxide refined product stream 52. The exemplary methods described below provide automated methods of measuring the concentrations of impurities in the liquid ethylene oxide refined product stream 52. In certain examples, the amount (by weight) of ethylene oxide in the ethylene oxide refined product stream 52 is at least about 85 percent, preferably at least about 95 percent, more preferably, at least about 99 percent, and still more preferably at least about 99.5 percent.

The amount of each of acetaldehyde and formaldehyde in the liquid ethylene oxide refined product stream 52 by weight of the liquid ethylene oxide refined product stream 52 is preferably no more than about 30 ppm, more preferably no more than about 20 ppm and still more preferably no more than about 10 ppm. However, the amount of total aldehydes by weight of the liquid ethylene oxide refined product stream 52 is preferably no more than about 20 ppm, more preferably no more than about 15 ppm, and still more preferably no more than about 10 ppm. The amount of carbon dioxide by weight of the liquid ethylene oxide refined product stream 52 is preferably no more than about 100 ppm, more preferably no more than about 50 ppm, and still more preferably no more than about 20 ppm. The amount of water by weight of the liquid ethylene oxide refined product stream 52 is preferably no more than about 200 ppm, more preferably no more than about 100 ppm, and still more preferably no more than about 50 ppm.

Figure 2:
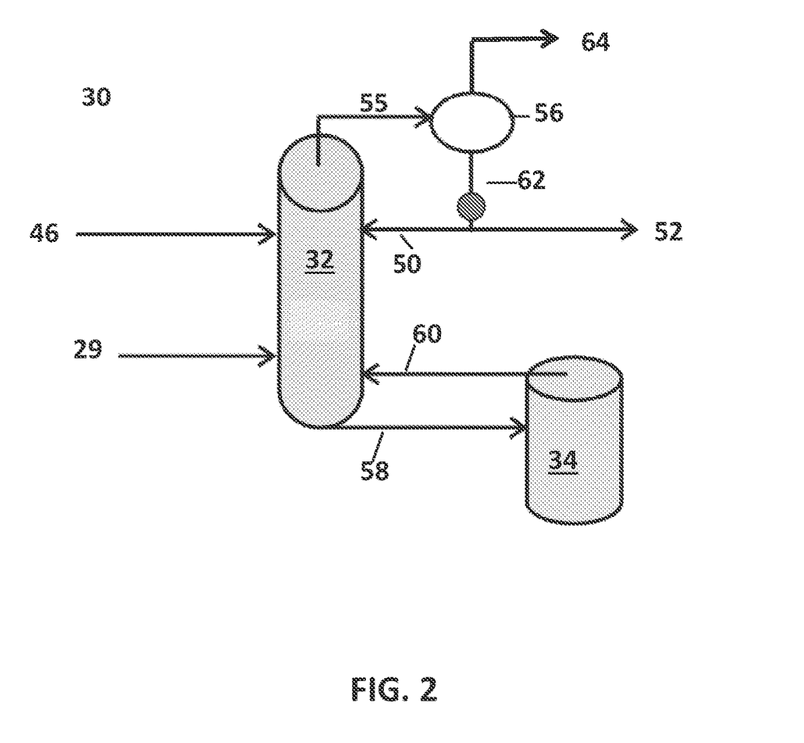
FIG. 2 is a schematic view of an ethylene oxide refining unit.

Referring now to FIG. 2, an example of an ethylene oxide refining unit 30 is depicted. In accordance with the example, ethylene oxide refining unit 30 comprises an ethylene oxide purification column 32, and an ethylene oxide refining column 34. As used herein, an "ethylene oxide purification column," "purification column," and/or "column" refers to, for example, a generally upright, cylindrical column or tower containing separation stages, such as trays and/or packing elements, where the trays and/or packing elements provide a surface area for a liquid and a gas to come into contact, facilitating mass transfer between the liquid and the gas. As will be appreciated, the column can also have other shapes and general orientations including a polygonal shaped column that is positioned in a horizontal orientation. The ethylene oxide purification column 32 includes a first section and a second section separated by a tray, such as a chimney tray. The ethylene oxide purification column 32, or column, as discussed herein, can have a diameter ranging from, for example, 65 centimeters (cm) to 6 meters (m) and have a height ranging from, for example, 6 m to 60 m or more. The ethylene oxide refining unit feed stream 29 enters a lower portion of the purification column 32, and a condensate (water) stream 46 is fed to the purification column 32 above the EO refining unit feed stream 29. The contact between downward falling liquid and upward rising vapor at the packing and/or trays inside of ethylene oxide purification column 32 separates the carbon dioxide, water, and aldehydes from ethylene oxide. The overhead vapor stream 55 is condensed in a condenser (not shown), and yields a mixed phase stream in reflux drum 56. Light ends are vented off through vent line 64. Heavier components are condensed and exit reflux drum 56 in outlet stream 62. A portion of the reflux drum liquid outlet stream 62 is sent back to the column 32 via reflux stream 50, and the other portion of reflux drum liquid outlet stream 62 becomes the liquid ethylene oxide refined product stream 52.

Although not shown in FIG. 2, ethylene oxide purification column 32 may also include a reboiler that receives a portion of a bottoms stream from the bottom of column 32 and vaporizes a portion thereof which is then fed back into the column 32. As depicted in FIG. 2, bottom product stream 58 is the net liquid bottoms product from column 32 exclusive of the portion sent to the reboiler. The liquid bottoms product 58 is fed to an ethylene oxide refining column 34 which may be structured with trays and/or packing and which may include a condenser and/or reboiler. The overhead vapor product 60 from the condenser (not shown) of the refining column 34 is fed back to the ethylene purification column 32. Again, the depicted purification column 32 and refining column 34 are merely exemplary. The automated methods described herein for detecting and measuring the concentration of impurities in a liquid ethylene oxide stream (and/or for determining the ethylene oxide concentration therein) have application beyond any particular process of purifying or refining ethylene oxide. However, they are useful in liquid ethylene oxide purification processes because they overcome challenges in obtaining such automated measurements in streams with high concentrations of ethylene oxide and low concentrations of impurities.

In the example of FIG. 2, it is desirable to measure the concentration of impurities in the liquid ethylene oxide refined product stream 52. An on-line gas chromatograph analyzer system 69 (FIG. 4) is used to do this.

In a gas chromatograph a carrier gas and a sample gas of unknown composition are mixed together and introduced to one column or a series of columns (both a single column and multiple columns in series are referred to as a "gas chromatograph train" herein), each of which contains a stationary phase that interacts with the carrier gas and the various constituents of the sample gas in different ways. The compound specific interactions cause the various compounds to flow through and exit the column or columns at different times. For a given sample, the time that each compound remains in the gas chromatograph train or the elapsed time from when the compound enters the sampling system until its presence is detected by the gas chromatograph effluent detector 74 is referred to as "retention time".

The gas chromatograph effluent detector 74 generates a relative signal between the unknown compound and the carrier gas when each compound reaches the detector 74. The signal can be used to determine the concentration of each unknown constituent compound. The rate of elution of each constituent compound from the gas chromatograph train is often temperature dependent. Thus, the gas chromatograph train is typically housed in a thermally controlled environment so that the signal measurements indicative of the presence of each compound may be correlated to a particular temperature and compensated if necessary to a different temperature. Various types of gas chromatograph effluent detectors exist, including flame ionization detectors, thermal conductivity detectors, micro thermal conductivity detectors (TCDs with much higher sensitivities and the ability to detect concentrations of trace impurities), electron capture detectors, flame photometric detectors, and photo ionization detectors. Because of the very small concentrations of impurities in liquid ethylene oxide refined product stream 52, micro thermal conductivity detectors are preferred. Many of the other known gas chromatograph effluent detectors lack the ability to accurately determine concentrations at the ppm level.

Another challenge presented in obtaining on-line impurity concentrations in liquid ethylene oxide refined product stream 52 is that liquid ethylene oxide tends to polymerize when heated to vaporization. Thus, introducing liquid ethylene oxide directly into the gas chromatograph analyzer system directly is problematic.

Figure 3:
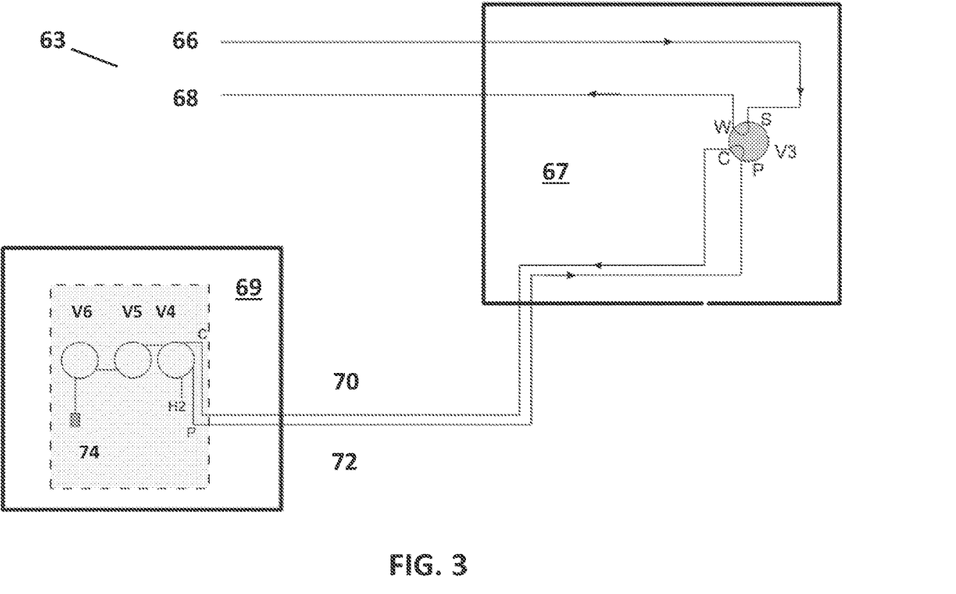
FIG. 3 is a schematic view of an ethylene oxide impurity detection system comprising a sample conditioning system and a GC analyzer system.
Figure 4:
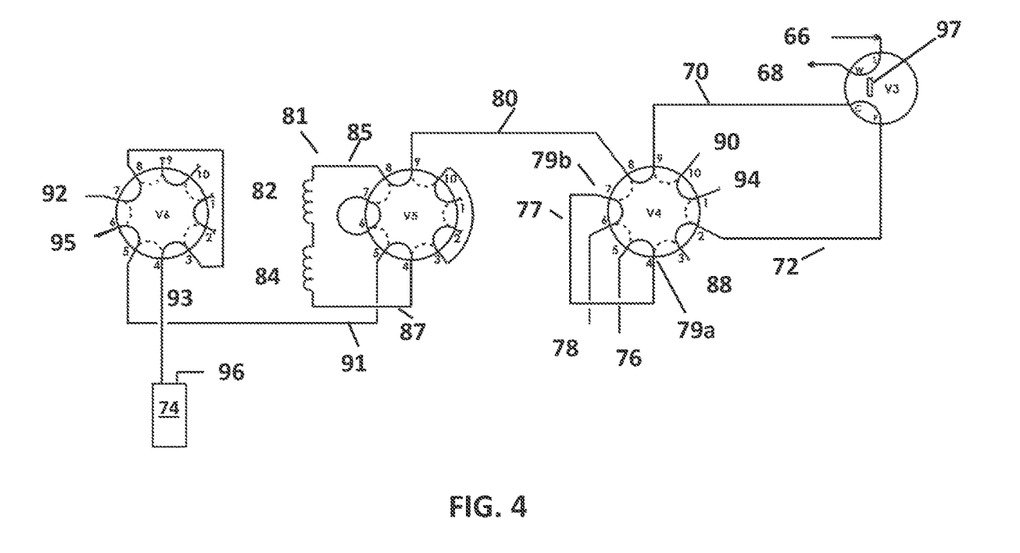
FIG. 4 is a detailed schematic view of the multi-port remote injection valve from the sample conditioning system of FIG. 3 and the multi-port gas standard valve, multi-port separation valve, and multi-port diversion valve of the GC analyzer system of FIG. 3.

As explained in detail below, FIGS. 3 and 4 depict a system 63 for determining the concentration of at least one impurity in liquid ethylene oxide refined product stream 52. The system 63 is preferably configured to provide gas chromatograph concentration values for at least one liquid ethylene oxide refined product stream impurity selected from the group consisting of acetaldehyde, formaldehyde, water, and carbon dioxide in the liquid ethylene oxide refined product stream 52. Liquid ethylene oxide from the reflux drum outlet stream 62 is loaded into internal passageway 97 which defines a sample chamber within a multi-port remote injection valve V3. The sample chamber 97 is in selective fluid communication with the gas chromatograph train 81 and the reflux drum outlet stream 62. Periodically, a carrier gas purges the accumulated ethylene oxide from the sample chamber 97 and introduces it into gas chromatograph train 81.

In the same or other examples, the system 62 is preferably configured to divert the ethylene oxide peak of a sample from the GC effluent detector 74 and into vent stream 95. In the same or other examples, the system 63 is preferably configured to inject the small volumes of liquid ethylene oxide into a carrier gas stream such that the ethylene oxide flash vaporizes and is carried into the GC train by the carrier gas. The preferred carrier gas is hydrogen.

The system 63 comprises a sample conditioning system 67 and a gas chromatograph analyzer system 69. The gas chromatograph analyzer system 69 comprises a gas chromatograph train 81 having a gas chromatograph effluent stream 87. The gas chromatograph train 81 is in selective fluid communication with the sample chamber 97. The phrase "selective" fluid communication refers to the fact that a process may be altered by an operator to place two pieces of equipment or location in fluid communication with one another or to isolate one from the other so a continuous fluid path does not exist from one piece of equipment or location to the next. The phrase "fluidly coupling" means to place two pieces of equipment or process locations into fluid communication with one another.

The system 63 for determining the concentration of at least one impurity in liquid ethylene oxide product stream 52 also includes a gas chromatograph effluent detector 74. The gas chromatograph effluent stream 87 is in selective fluid communication with the detector 74 and vent stream 95 and can be fluidly coupled to one or other (but not both) of detector 74 and the vent stream 95 at any one time. When the gas chromatograph effluent detector 74 is in fluid communication with the gas chromatograph effluent stream 87, the gas chromatograph effluent detector 74 generates a signal indicative of a concentration of at least one impurity in the gas chromatograph effluent stream 87.

In certain processes, the tolerance for impurities in the liquid ethylene oxide refined product stream 52 is very low, with impurity specifications on the order of less than 100 ppm by weight. The operating conditions of the purification column 32, such as reflux rate or ratio, the reflux drum 56 temperature, the condenser (not shown) outlet temperature, the condenser coolant flow rate, the reboiler (not shown) heating medium flow rate, the reboiler outlet temperature, the column top temperature, and/or the column pressure, may be manipulated to obtain a desired level of impurities in the liquid ethylene oxide refined product stream 52. Also, reaction variables from the reaction system 20, such as oxygen concentration in the feed gas, reaction temperature, aldehyde production rates from the ethylene oxide reactor 22, and/or the ethylene or oxygen conversion of reactor 22 may be manipulated to keep impurity levels below specifications.

The sample of liquid ethylene oxide refined product stream 52 can be taken off of the reflux drum liquid outlet 62, the product stream 52 or the reflux stream 50, as each has the same composition. When the liquid ethylene oxide refined product stream 52 is mentioned herein as being in fluid communication with a portion of system 63 (described further below) it is understood that the direct fluid connection with system 63 may be to the reflux drum outlet stream 62, the reflux stream 50 or the product stream 52 but that all three streams have the same composition and are in fluid communication with one another.

In known processes the concentrations of impurities in the product stream 52 are determined by pulling samples of one of ethylene oxide purification column streams 50, 52, or 62 and sending it to a laboratory for analysis. The lag time in obtaining concentrations from lab sampling can be several hours. If a sample is off spec, the product stream 52 may have been off spec for several hours and it may take several additional hours before the process variables can be adjusted sufficiently to get the product stream 52 back on-spec. In addition, sampling problems such as getting water in the sample on the way to the lab. Also, frequent manual sampling and analysis is expensive and creates possible personnel exposure issues.

Referring to FIG. 3 an automated ethylene oxide impurity detection system 63 comprising a sample conditioning system 67 and a gas chromatograph analyzer system 69 is shown. Sample conditioning system 63 comprises a multi-port remote injection valve V3 which receives liquid ethylene oxide from fast ethylene oxide purge streams 66 and 68 and which periodically injects liquid ethylene oxide samples from sample chamber 97 (FIG. 4) into a carrier gas outlet stream 70. Carrier gas inlet stream 72 is fluidly coupled to the carrier gas outlet stream 70.

GC analyzer system 69 comprises a multi-port gas standard valve V4, a multi-port gas separation valve V5, and a multi-port gas diversion valve V6. Multi-port gas standard valve V4 is connected to the multi-port remote injection valve V3 and the multi-port gas separation valve V5. Multi-port gas separation valve V5 is connected to GC train 81, multi-port gas standard valve V4, and multi-port diversion valve V6. The multi-port GC valves V4-V6 are of a type known in the art. In each of them, alternating pairs of adjacent ports are in fluid communication with one another. The valves are typically actuated by a digital signal that causes the valve rotor to rotate by one port. The rotation of the valve rotor changes which valve ports are in fluid communication with one another. In FIG. 4 solid arcs between adjacent ports indicates that the ports are in fluid communication with one another when the valve is in the OFF state. The dashed lines between adjacent ports indicates that the ports are in fluid communication with one another when the valve is in the ON state. Among other functions, valve V3 selectively injects liquid ethylene oxide samples into a carrier gas stream 70 for delivery to the GC train 81. Valve V4 allows for selective routing of a standard gas or the liquid ethylene oxide sample provided by valve V3 into the GC train 81, and valve V6 selectively diverts ethylene oxide peaks from the GC effluent detector 74 by fluidly coupling the V5 outlet stream 87 to a vent line 95 or the GC effluent detector inlet line 93.

FIG. 4 shows the impurity detection system 63 in a default configuration (OFF state) in which no sampling or analysis of ethylene oxide occur. In the default configuration, carrier gas stream 88 flows into and out of multi-port gas standard valve V4, into and out of multi-port remote injection valve V3, back into and out of multi-port gas standard valve V4, into multi-port separation valve V5, out of multi-port separation valve V5, into GC train 81, into and out of multi-port separation valve V5, into multi-port gas diversion valve V6 and into vent line 95. Thus, in FIG. 4 V4 carrier gas inlet line 88 is in fluid communication with V6 vent line 95 and with GC train 81. In the default configuration, internal passageway/sample chamber 97 of multi-port remote injection valve V3 is in fluid communication with liquid ethylene oxide fast purge inlet and outlet lines 66 and 68, respectively, as well as with reflux drum outlet line 62. In the default configuration of FIG. 4, gas standard inlet line 76 and gas standard outlet line 78 are each in fluid communication with gas standard sample loop 77. However, the gas standard sample loop 77 is isolated from GC train 81. GC effluent stream 87 is in fluid communication with multi-port gas diversion valve vent line 95 and is isolated from gas chromatograph effluent detector 74. Multi-port diversion valve carrier gas inlet line 92 is in fluid communication with gas chromatograph effluent detector inlet stream 93 so that even in the default configuration, carrier gas keeps flowing through detector 74.

In the default configuration of FIG. 4, the sample chamber 97 has liquid ethylene oxide from fast ethylene oxide purge inlet stream 66 flowing through it. At this point, the sample chamber is in fluid communication with liquid fast purge ethylene oxide inlet line 66 and outlet line 68, but is isolated from V3 carrier gas inlet line 72 and outlet line 70. When a sample analysis is desired, sample chamber 97 is fluidly coupled to V3 carrier gas inlet and outlet lines 72 and 70, and V6 inlet line 91 is fluidly coupled to GC effluent detector inlet stream 93 so that the components exiting the GC are detected. At a time when the ethylene oxide peak is expected to reach GC effluent detector 74, valve V6 rotates to place carrier gas inlet stream 92 in fluid communication with GC effluent detector inlet stream 93 and to place V6 inlet stream 91 in fluid communication with vent stream 95 (as shown in FIG. 4). During a diversion operation, valves V3-V5 remain oriented as shown in FIG. 4.

Because the tested sample from reflux drum 62 is liquid, normally it would be desirable to use a liquid standard to calibrate the GC effluent detector 74 response to individual compounds. However, liquid ethylene oxide has a vapor pressure that is too high to prepare a standard with appropriate impurity concentrations. As a result, a gas standard is used in the system 63. Multi-port gas standard valve V4 has a gas standard inlet line 76, gas standard outlet line 78, and gas standard sample loop 77. In the default configuration of FIG. 4, the gas standard flows through inlet line 76, into sample loop 77, and out of gas standard outlet line 78. When it is desired to run the gas standard through the GC train, the multi-port gas standard valve V4 rotor rotates by one port position. The rotation disconnects the gas standard inlet and outlet lines 76 and 78 from sample lop 77. It also places the carrier gas inlet stream 88 in fluid communication with a sample loop 77 inlet 79$a$ and places a sample loop outlet 79$b$ in fluid communication with multi-port separation valve inlet line 80 as well as GC train 81. When analyzing a gas standard, V3 carrier gas outlet line 70 is in fluid communication with carrier gas inlet line 90 and purge line 72. Thus, carrier gas continues to flow through ports P and C on valve V3, albeit in a direction opposite the direction the carrier gas flows in when analyzing an ethylene oxide sample. When analyzing a gas standard, the multi-port diversion valve V6 would remain in the same rotational position as for measuring a sample of a unknown stream (i.e., rotated by one port relative to what is shown in FIG. 4).

The sample conditioning system 67 provides for remote injection (remote with respect to the GC analyzer system 69) of small volumes of the liquid ethylene oxide refined product stream 52 into a carrier gas. Because the injection is done remotely, the liquid ethylene oxide is not subjected to the relatively higher temperatures of the GC analyzer system 69. The injected volumes of ethylene oxide are minimized to reduce the accumulation of entrained polymerized ethylene oxide in the sample conditioning system 67 and GC analyzer system 69. The carrier gas flowing through lines 72 and 70 is preferably inert with respect to ethylene oxide and the associated impurities. The carrier gas also preferably has a thermal conductivity at the operating temperature of the GC which is appreciably different from the thermal conductivities of ethylene oxide and the associated impurities so that the thermal conductivity peaks for these compounds are sufficiently different from those of the carrier gas to make reliable concentration determinations feasible. One suitable carrier gas is hydrogen.

The sample conditioning system 67 preferably introduces small volumes of the liquid ethylene oxide from sample chamber 97 into a carrier gas such that the volume of liquid ethylene oxide vaporizes without polymerizing. The "fast EO purge inlet" stream 66 is drawn off of the reflux drum liquid outlet stream 62 and is continuously circulated through a multi-port remote injection valve V3 (FIG. 3).

As shown in FIG. 3, the fast EO purge inlet stream 66 enters the remote injection valve V3 through an inlet port S. The stream exits the valve V3 thorough outlet port W to define a "fast EO purge outlet" stream 68. Although not so indicated in FIG. 4, prior to a sampling event, internal passageway 97 is in fluid communication with S and W so that liquid ethylene oxide flows through the internal passageway 97 before exiting at port W. At this point, the internal passageway 97 is isolated from the channel connecting ports P and C and through which carrier gas flows in valve V3. When a sample GC analysis is desired, valve V3 is adjusted to place passageway 97 into fluid communication with the ports P and C and to isolate passageway 97 from ports S and W. At the moment the adjustment is made, the internal passageway 97 is holding a volume of liquid ethylene oxide "captured" from the fast EO purge inlet stream 66. Thus, the internal passageway 97 acts as a sample chamber of fixed volume, the contents of which are purged by the carrier gas flowing through carrier ports P and C in multi-port remote injection valve V3.

During an injection of liquid ethylene oxide from multi-port remote injection valve V3, carrier gas flows through internal passageway/sample chamber 97 before exiting at port C. Thus, the volume of the injected liquid ethylene oxide is defined by the volume of passageway 97. The passageway (or sample chamber) 97 preferably remains in fluid communication with the ports C and P until the GC analysis is complete to avoid creating baseline signal disturbances by disturbing the flow of carrier gas. The passage of the liquid EO through the internal V3 sample passage 97 and into carrier gas port C causes the liquid EO contained in the passageway 69 to flash vaporize (due to the pressure drop) without heating the liquid EO (which can cause it to polymerize). Thus, the sample conditioning system 67 provides a sample of carrier gas and a small injected volume of EO to the gas chromatograph analyzer system 69 while avoiding the polymerization of the sampled ethylene oxide.

Commercially available valves that are suitable for use as multi-port remote injection valve V3 include the Valco Injector, Microvolume Sample Injection Valve supplied by the Valco Instruments Co. Inc. subsidiary of VICI Ag International. The valve has a fixed volume, internal sample flowpath (i.e., internal passageway 97) that also acts as a sample chamber and which is defined by a passage engraved on the valve rotor. The amount of liquid ethylene oxide injected into the carrier gas at each injection interval is preferably at least about 0.1 ml, more preferably at least about 0.15 ml, and even more preferably at least about 0.18 ml. In the same or other examples, the amount of liquid ethylene oxide injected at each injection interval is preferably no more than about 0.3 ml, more preferably no more than about 0.25 ml, and even more preferably not more than about 0.22 ml. The injection of the liquid ethylene oxide from sample chamber 97 into carrier gas stream 70 provides a defined reference time that can be used to plot the gas chromatograph effluent detector 74 signal response and determine the concentrations of at least one of the constituents of the liquid ethylene oxide refined product stream 52 (which has the same composition as the reflux drum liquid outlet stream 62). Preferably, the concentrations of acetaldehyde, formaldehyde, carbon dioxide, and water are determined by the gas chromatograph effluent detector 74. Certain gas chromatograph detectors, such as thermal conductivity detectors, have a reference gas 96. The reference gas compensates for drift due to flow or temperature fluctuations.

Referring again to FIGS. 3 and 4, multi-port gas standard valve V4 is a gas chromatograph gas standard valve. In the figures, valve V4 is a multi-port valve having ten (10) ports. The valve rotor rotates between two positions to adjust the ports to which the various inlets and outlets are connected. Valves V5 and V6 operate similarly. However, other configurations may be used. The two positions of V4 route the either the ethylene oxide unknown sample from V3 or a gas standard from gas standard sample loop 77 to V4 outlet line 80 and into GC train 81.

In the configuration of FIG. 4, the gas standard is isolated from the GC train 81, and the carrier gas from V4 carrier gas inlet stream 88 flows through GC train 81. When the impurity detection system 63 is in the configuration of FIG. 4, the gas standard flows into valve V4 via gas standard inlet 76, enters gas standard sample loop 77, re-enters valve V4 at port 7, and exits V5 out via gas standard line 78. When it is desired to analyze the gas standard, the position of V4 is adjusted so that the gas standard flows from inlet 76, into port 5 and out of port 6, thereby isolating the flowing gas standard from sample loop 77. The carrier gas stream 88 is then connected to port 3, causing the carrier gas to flow through sample loop 77, which purges the gas standard from the sample loop 77 and routes it to the GC train 81 via V5 inlet line 80. At this point, the position of valve V6 is preferably already adjusted so that the gas standard/carrier gas mixture will flow out of valve V6 and into GC effluent stream detector 74. Thus, the impurity detection system 63 allows for the testing of a fixed volume of a gas standard.

The rotational position of the valve V4 determines which valve V4 inlet streams are in fluid communication with which valve outlet streams. The gas chromatograph standard valve V4 is configured to selectively place either (but not both) of the carrier gas/liquid ethylene oxide from the sample chamber 97 of multi-port remote injection valve V3 and a standard gas 76 in fluid communication with multi-port gas separation valve V5. When the liquid ethylene oxide refined product stream 52 is being analyzed, the V3 carrier gas outlet line 70 from remote microinjection valve V3 is in fluidly coupled to multi-port separation valve V5 inlet line 80, and V3 carrier gas inlet line 88 is fluidly coupled to carrier gas outlet line 70 from valve V3. In that configuration, carrier gas from carrier gas inlet line 90 flows out of purge line 94. When the gas standard is being analyzed, the carrier gas line 70 from valve V3 is fluidly coupled to carrier gas inlet line 90 on valve V4 instead of to V5 inlet stream 80. Thus, valve V4 is also configured to flow carrier gas through ports C and P on valve V3 regardless of whether the multi-port remote injection valve V3 is fluidly coupled to valve V4 or to purge line 94.

For example, in the rotational position depicted in FIG. 4, the carrier gas line 70 from the multi-port remote injection valve V3 is in fluid communication with the multi-port gas separation valve V5 gas inlet line 80, which is part of the flow path to the gas chromatograph train 81. When multi-port gas standard valve V4 is in the rotational position of FIG. 4, V3 carrier gas inlet line 88 of V4 is in fluid communication with V3 carrier gas inlet line 72 which enters port P on multi-port remote injection valve V3. Thus, in the rotational position of FIG. 4, valve V4 places carrier gas (but not ethylene oxide sample chamber 97) in fluid communication with multi-port gas separation valve V5. This position provides a way of routing the carrier gas/ethylene oxide to gas chromatograph train 81.

As indicated above, multi-port remote gas standard valve V4 is fluidly coupled to multi-port separation valve V5 via multi-port gas standard valve outlet line 80. Multi-port separation valve V5 is connected to inlet line 80 (which is an outlet line from valve V4) and a GC inlet line 85. GC train 81 comprises first GC column 82 which is in series with second GC column 84. First GC column 82 and second GC column 84 are preferably configured to separate the impurities in the sampled liquid EO. In certain examples, first GC column 82 is a medium bore mid polarity column, and column 84 is a medium bore, low polarity column. The "polarity" of a column refers to the polarity of the molecules for which the stationary phase of the column gas an affinity. The use of different columns in series with different polarities allows the GC train 81 to better separate molecules that would not be readily separable in a single column.

In the rotational position shown in FIG. 4, V5 is fluidly coupled to multi-port separation valve V5 outlet line 85 which is also the GC train 81 inlet line and to multi-port diversion valve V6 via V5 outlet line 91. In certain examples involving liquid ethylene oxide refined product streams, acetaldehyde and ethylene oxide have peaks that are relatively close to one another, and because of the high purity of the stream, the ethylene oxide peak is much larger than the acetaldehyde peak. As a result, ethylene oxide tends to overrange the GC effluent detector 74. The proximity of the peaks and large difference in peak heights makes accurate determination of the acetaldehyde concentration difficult. In accordance with certain examples herein, the ethylene oxide peak is diverted from the GC train 81 to provide more accurate acetaldehyde determinations.

In certain examples, the gas chromatograph effluent stream 87 may be selectively fluidly coupled to the gas chromatograph effluent detector inlet stream 93 and to V6 vent stream 95. The gas chromatograph effluent stream 87 will be fluidly coupled to only one of stream 93 and stream 95 at any one time. As illustrated in FIG. 4, gas chromatograph effluent stream 87 is fluidly coupled to V6 vent stream 95, as would be the case when diverting an EO peak. When analysis is desired, the V6 rotor is rotated such that the V5 outlet stream 91 is fluidly coupled to the gas chromatograph effluent detector inlet stream 93. The diversion of an EO peak can be timed based on acquired knowledge of when the EO peak should appear relative to when the sample chamber 97 is placed in fluid communication with V3 carrier gas inlet 72 and outlet 70 streams (e.g., from gas standard testing).

Preferred times for turning V3 and V6 ON are at least about one second, preferably, at least about two seconds, and more preferably, at least about three seconds. In the same or other examples, preferred times for turning V3 and V6 ON are no greater than 10 seconds, more preferably no greater than about nine seconds, and still more preferably, not greater than about seven seconds. The times for turning V3 and V6 ON may be the same or different.

Preferred times for turning V3 and V6 OFF are at least about 400 seconds, more preferably at least about 450 seconds, and still more preferably at least about 475 seconds. In the same or other examples, preferred times for turning V3 and V6 OFF are no more than about 600 seconds, more preferably no more than about 550 seconds, and still more preferably not more than about 525 seconds. The time for turning V6 OFF is preferably selected to ensure that the full acetaldehyde peak is detected by gas chromatograph effluent detector 74 without also detecting any of the adjacent ethylene oxide peak. The times for turning V3 and V6 OFF may be the same or different.

The ethylene oxide impurity detection system 63 of FIGS. 3 and 4 may be used to provide continuous concentration values of the various impurities in the liquid ethylene oxide refined product stream 52. Sampling frequencies (ts) of no less than about 1.0 hour$^{-1}$ are preferred, and sampling frequencies of no more than about 0.5 hour$^{-1}$ and no more than about 0.2 hour$^{-1}$ are more preferred and especially preferred, respectively. The concentration values provided by the system 63 may be used for process control purposes to operate an ethylene oxide refining system 30 to keep the liquid ethylene oxide refined product 52 on specification. In certain examples, a composition controller may be provided which takes one or more of the impurity concentration values (acetaldehyde, formaldehyde, carbon dioxide, water) as an inlet and manipulates one or more ethylene oxide 32 process variables to keep those one or more impurities within concentration specifications. Such process variables may include reactor 22 process variables (such as oxygen rate, reactor temperature, reactor pressure, total reactor product aldehyde concentration, ethylene conversion, oxygen conversion) and ethylene oxide purification column 32 or refining column 34 process variables such as reflux rate, the reflux ratio, condenser outlet temperature, condenser coolant flow rate, reboiler heating medium flow rate, reboiler outlet temperature, column pressure, and column feed rate.

The ethylene oxide impurity detection system 63 is also particularly well suited for computerized, model-based concentration predictors and control in which predicted values of the various impurities in the liquid ethylene oxide refined product stream 52 are calculated based on ethylene oxide process variable values, such as the reactor 22, purification column 32, and refining column 34 process variables mentioned above. The measured concentrations from the ethylene oxide impurity detection system 63 may then be used to update the model. The model may be structured as a linear model, a linear model with weighted values of various inputs, a non-linear model, a neural network, etc.

A computer program taking input from the gas chromatograph effluent detector 74 may use measured values of the various impurities to update the model, such as by updating a bias or weighted bias based on the difference between the measured and predicted impurity concentration values at a particular time. The model and/or the measured impurity concentrations from the ethylene oxide impurity detection system 63 may be used as inputs to a composition controller that resets a purification column 32 top temperature controller (which is cascaded to a reflux ratio or rate controller) or to a dynamic matrix controller that manipulates several manipulated variables, including without limitation the ethylene oxide purification column 32 and or refining column 34 variable values and/or reactor variables described above.

In one example, a system for controlling the concentration of at least one impurity in a liquid ethylene oxide stream is provided which comprises a computer readable medium and a controller. The computer readable medium has stored thereon (i) a set of computer readable instructions comprising a mathematical model relating a predicted value of the concentration of the at least one impurity to values of a plurality of ethylene oxide purification column process variables such that when executed by a computer processor, the computer readable instructions (i) calculate a predicted value of the concentration of the at least one impurity from the mathematical model and the values of the plurality of ethylene oxide purification column process variables, and (ii) update the mathematical model based on the predicted value of the concentration of the at least one impurity and at least one value of the concentration of the at least one impurity determined by the ethylene oxide impurity detection system 63.

What is claimed is:

1. An automated method for determining the concentration of impurities in a liquid ethylene oxide stream fluidly coupled to a processing unit, the liquid ethylene oxide stream having at least 85 percent by weight ethylene oxide and at least one impurity, the method comprising:
    injecting a sample volume from the liquid ethylene oxide stream into a gas chromatograph train as the liquid ethylene oxide stream is produced by the processing unit, the gas chromatograph having a gas chromatograph effluent stream; and
    generating at least one signal indicative of the corresponding concentration of the at least one impurity.

2. The automated method of claim 1, wherein the step of injecting a sample volume from the liquid ethylene oxide stream into a gas chromatograph train having a gas chromatograph effluent stream comprises accumulating the sample volume of liquid ethylene oxide from the liquid ethylene oxide stream in a sample chamber that is in selective fluid communication with the liquid ethylene oxide stream and the gas chromatograph train, and fluidly coupling the sample chamber to the gas chromatograph train.

3. The automated method of claim 1, wherein the at least one impurity is selected from the group consisting of acetaldehyde, formaldehyde, carbon dioxide, and water.

4. The automated method of claim 1, wherein the step of injecting a sample volume of the liquid ethylene oxide stream into a gas chromatograph train comprises fluidly coupling a sample chamber containing the sample volume to a carrier gas stream such that the carrier gas introduces the sample stream into the gas chromatograph train.

5. The automated method of claim 4, wherein the step of fluidly coupling the sample chamber to the carrier gas stream comprises flash vaporizing the sample volume.

6. The automated method of claim 1, wherein the gas chromatograph train is contained in a temperature controlled housing operated at a first temperature, and the step of the injecting the sample volume into the gas chromatograph train comprises injecting the sample volume into a carrier gas stream outside of the housing at a second temperature less than the first temperature.

7. The automated method of claim 1, wherein the step of generating the at least one signal indicative of the corresponding concentration of the at least one impurity comprises introducing the gas chromatograph effluent stream into a gas chromatograph effluent detector, and the automated method further comprises diverting a portion of the gas chromatograph effluent stream away from the gas chromatograph effluent detector, wherein the diverted portion of the gas chromatograph effluent corresponds to ethylene oxide.

8. The automated method of claim 7, wherein the at least one impurity comprises acetaldehyde, acetaldehyde has a retention time, ethylene oxide has a retention time, and the step of diverting a portion of the gas chromatograph effluent stream away from the gas chromatograph effluent detector comprises diverting the portion of the gas chromatograph effluent after the expiration of the acetaldehyde retention time and before the expiration of the ethylene oxide retention time.

9. A method of operating an ethylene oxide purification column having a liquid ethylene oxide product stream, the method comprising:
    performing the method of claim 1 to determine the concentration of at least one impurity in the liquid ethylene oxide product stream, wherein the processing unit comprises the ethylene oxide purification column, and the liquid ethylene oxide stream comprises the liquid ethylene oxide product stream;
    updating a mathematical model relating a variable predicted concentration of the at least one impurity in the liquid ethylene oxide product stream to selected ethylene oxide purification column process variables based on the at least one signal indicative of the corresponding concentration of the at least one impurity;
    calculating a predicted concentration value of the at least one impurity in the liquid ethylene oxide product stream based on values of the selected process variables and the updated mathematical model; and
    adjusting a value of at least one ethylene oxide purification column process variable based on the predicted concentration value of the at least one impurity.

10. A system for automatically determining the concentration of at least one impurity in a liquid ethylene oxide stream produced by and fluidly coupled to a processing unit, the liquid ethylene oxide stream having at least 85 percent by weight ethylene oxide, the system comprising:
    a gas chromatograph train having a gas chromatograph effluent stream, wherein the gas chromatograph train is in selective fluid communication with a liquid ethylene oxide sample chamber that is in selective fluid communication with the liquid ethylene oxide stream and with a carrier gas stream;
    a gas chromatograph effluent detector, wherein the gas chromatograph effluent stream is in selective fluid communication with the gas chromatograph effluent detector and a vent stream, and when the gas chromatograph effluent stream is fluidly coupled to the gas chromatograph effluent detector, the gas chromatograph effluent detector generates a signal indicative of a concentration of at least one impurity in the gas chromatograph effluent stream.

11. The system of claim 10, further comprising:
    a gas chromatography analyzer system that comprises the gas chromatograph train and the gas chromatograph effluent detector, wherein an inlet stream to the gas chromatograph train is in selective fluid communication with the liquid ethylene oxide sample chamber, and when the gas chromatograph effluent stream is fluidly coupled to the vent stream, the gas chromatograph effluent stream bypasses the gas chromatograph effluent detector.

12. The system of claim 10, further comprising a multi-port separation valve connected to the gas chromatograph train.

13. The system of claim 12, further comprising a multi-port diversion valve connected to the multi-port separation valve and a multi-port diversion valve carrier gas inlet stream.

14. The system of claim 13, wherein the multi-port diversion valve is configured to selectively connect the gas chromatograph train to a gas chromatograph effluent detector and a vent stream.

15. A system for controlling the concentration of at least one impurity in a liquid ethylene oxide stream from an ethylene oxide purification column, comprising:

a computer readable medium having stored thereon a set of computer executable instructions comprising a mathematical model relating a variable predicted concentration of the at least one impurity to a plurality of ethylene oxide purification column process variables such that when executed by a computer processor, the computer executable instructions (i) calculate a predicted value of the concentration of the at least one impurity from the mathematical model and values of the plurality of ethylene oxide purification column process variables; and (ii) update the mathematical model based on the predicted value of the concentration of the at least one impurity and at least one value of the concentration of the at least one impurity determined by the system of claim 10; and a controller that automatically adjusts the value of one or more of the plurality of ethylene oxide purification column process variables based on the predicted value of the concentration of the at least one impurity.

* * * * *